(12) United States Patent
Lapierre et al.

(10) Patent No.: US 11,187,365 B2
(45) Date of Patent: Nov. 30, 2021

(54) CONNECTOR FOR PIPING NETWORKS

(71) Applicant: Donald Lapierre, Saint-Ludger (CA)

(72) Inventors: Donald Lapierre, Saint-Ludger (CA); Jean-François Goulet, St-Damien (CA); Yanick Dozois, La Présentation (CA)

(73) Assignee: LES EQUIPEMENTS LAPIERRE INC., Saint-Ludger (CA)

( * ) Notice: Subject to any disclaimer, the term of this patent is extended or adjusted under 35 U.S.C. 154(b) by 111 days.

(21) Appl. No.: 16/598,004

(22) Filed: Oct. 10, 2019

(65) Prior Publication Data

US 2020/0116285 A1     Apr. 16, 2020

Related U.S. Application Data

(60) Provisional application No. 62/859,815, filed on Jun. 11, 2019, provisional application No. 62/744,361, filed on Oct. 11, 2018.

(51) Int. Cl.
*F16L 41/06* (2006.01)
*A01G 23/14* (2006.01)

(52) U.S. Cl.
CPC ............. *F16L 41/06* (2013.01); *A01G 23/14* (2013.01)

(58) Field of Classification Search
CPC ................................. F16L 41/06; A01G 23/14
USPC ................................................. 137/317, 318
See application file for complete search history.

(56) References Cited

U.S. PATENT DOCUMENTS

| 3,622,184 | A | * | 11/1971 | Deasy et al. | F16L 41/12 285/197 |
| 3,694,009 | A | * | 9/1972 | Phillips | F16L 47/30 285/197 |
| 5,170,813 | A | * | 12/1992 | Francis | F16L 41/06 137/15.13 |
| 5,732,732 | A | * | 3/1998 | Gross et al. | F16L 41/06 137/318 |
| 7,886,773 | B2 | * | 2/2011 | Mainzer | G01F 15/185 138/93 |

(Continued)

FOREIGN PATENT DOCUMENTS

CA        2855396 C     12/2015

OTHER PUBLICATIONS

Youtube video on Sep. 15, 2013 « https://www.youtube.com/watch?v=Xvnmd3MpLX0 » see at 9:58 and 12:18.

*Primary Examiner* — Kevin L Lee
(74) *Attorney, Agent, or Firm* — Norton Rose Fulbright Canada LLP

(57) ABSTRACT

A connector for fluidly connecting a collector pipe and a feeder pipe is disclosed, with a retaining member defining a curved base defining a pair of platforms at opposite ends thereof and facing towards each other upon the connector being mounted on the collector pipe. The base is resiliently deformable such that in a non-deformed state, a radius of curvature of the base is smaller than an outer radius of the collector pipe and a distance between the platforms is smaller than a diameter of the collector pipe. The platforms is displaceable away from each other to vary the distance between them to mount the connector and to exert a clamping force on the collector pipe. The connector has a connecting member engaging the feeder pipe. A piping network is also disclosed.

35 Claims, 11 Drawing Sheets

(56) References Cited

U.S. PATENT DOCUMENTS 9,435,476 B2* 9/2016 Vachon .................. A01G 23/14
2017/0261143 A1* 9/2017 Boyes ..................... F16L 41/06

* cited by examiner

CONNECTOR FOR PIPING NETWORKS

CROSS-REFERENCE TO RELATED APPLICATIONS

This application claims priority to U.S. provisional patent application 62/744,361 filed on Oct. 11, 2018, and to U.S. provisional patent application 62/859,815 filed on Jun. 11, 2019, the entire contents of each of which are incorporated by reference herein.

TECHNICAL FIELD

The application relates generally to devices for piping networks and, more particularly, to connecting assemblies for such piping networks.

BACKGROUND

Different types of connectors are used in piping networks (vacuum-type or gravity-type piping networks) found in maple sap (or other tree sap) harvesting installations. Initially, collector pipes in such installations, also known as the main lines, were typically severed at multiple locations therealong and connectors were installed at the severed junction for fluidly connecting feeder pipes, also known as lateral lines, to the collectors pipes. Installing such connectors was time-consuming and required sets of adapted tools, hence resulting in more time and initial expenses before operating the maple sap harvesting installations and in higher maintenance costs. Also, connectors typically offer a limited reliability after many years of use and may tend to leak over time.

SUMMARY

There is provided a connecting assembly for fluidly connecting a collector pipe and at least one feeder pipe, the connecting assembly comprising: a connector including: a base having an inner surface and an outer surface, a base opening being defined through the base; a connecting member extending from the outer surface of the base to a distal end of the connecting member for engaging the at least one feeder pipe, the connecting member having a connecting member opening being defined at the distal end; a fluid channel extending through the base and the connecting member between the base opening and the connecting member opening to convey fluid between the base and connecting member openings; a seal on the inner surface of the base, the seal configured to mate with the an outer surface of the collector pipe to sealingly mount the connector onto the collector pipe; and a retaining member mountable to the connector to press the base against the outer surface of the collector pipe and mount the connector to the collector pipe.

There is provided a method for fluidly connecting a collector pipe and at least one feeder pipe with a connecting assembly including a connector, a seal and a retaining member, the method comprising: sealingly mounting the seal of the connector onto an outer surface of the collector pipe to position the connector on the collector pipe; clamping part of the connector onto the collector pipe with the retaining member mounted to the connector and configured to wrap partially about the collector pipe; and connecting the at least one feeder pipe to another part of the connector.

There is provided a connector for fluidly connecting a collector pipe and a feeder pipe, the connector comprising: a retaining member defining a base having an inner surface and an outer surface, the base being curved to wrap at least partially about the collector pipe, the base defining a pair of platforms extending at opposite ends of the base and facing towards each other upon the connector being mounted on the collector pipe, the base being resiliently deformable such that in a non-deformed state, a radius of curvature of the base is smaller than an outer radius of the collector pipe and a distance between the platforms is smaller than a diameter of the collector pipe, the platforms being displaceable away from each other to vary the distance between them to mount the connector and to exert a clamping force on the collector pipe; and a connecting member extending from the outer surface of the base to a distal end of the connecting member for engaging the feeder pipe, the connecting member having a connecting member opening defined at the distal end and defining a fluid channel extending from the connecting member opening to receive fluid from the feeder pipe.

There is provided a connector for fluidly connecting a collector pipe and a feeder pipe, the connector comprising: a retaining member defining a base having an inner surface and an outer surface, the base being curved to wrap at least partially about the collector pipe, the base having opposite ends defining a gap therebetween, the base being resiliently deformable such that in a non-deformed state a radius of curvature of the base is smaller than an outer radius of the collector pipe and a distance of the gap is smaller than a diameter of the collector pipe, the opposite ends of the base being displaceable away from each other to increase the distance of the gap and to mount the retaining member around the collector pipe, the base in a deformed state exerting a clamping force on the collector pipe; and a connecting member extending from the outer surface of the base to a distal end of the connecting member for engaging the feeder pipe, the connecting member having a connecting member opening defined at the distal end and defining a fluid channel extending from the connecting member opening to receive fluid from the feeder pipe, a removable visual indicator disposed in the fluid channel to at least partially obstruct the fluid channel.

There is provided a method for fluidly connecting a collector pipe and a feeder pipe with a connector, the method comprising: clamping the connector on an outer surface of the collector pipe; removing a visual indicator at least partially fluidly obstructing a fluid channel of the connector; forming a hole in the collector pipe to be in fluid communication with the fluid channel; and connecting the feeder pipe to the connector to fluidly connect the feeder pipe to the collector pipe via the fluid channel.

There is provided a piping network for maple sap harvesting, the piping network comprising: a collector pipe; a feeder pipe; and a connector mounted on the collector pipe and connected to the feeder pipe to fluidly connect the feeder pipe to the collector pipe, the connector including: a retaining member defining a base having an inner surface and an outer surface, the base being curved to wrap at least partially about the collector pipe, the base defining a pair of platforms extending at opposite ends of the base and facing towards each other, the base being resiliently deformed and exerting a clamping force on the collector pipe; and a connecting member extending from the outer surface of the base to a distal end of the connecting member for engaging the feeder pipe, the connecting member having a connecting member opening defined at the distal end and defining a fluid channel extending from the connecting member opening to receive fluid from the feeder pipe.

DESCRIPTION OF THE DRAWINGS

Reference is now made to the accompanying figures in which.

DETAILED DESCRIPTION

In typical modern maple sap harvesting installations, one or more piping systems are attached to trees or supporting structures and run through the field at a certain height over the ground to route the maple sap harvested from multiple trees to a harvesting station. The piping systems typically include one or more collector pipes (also known as main lines) extending through the trees to which are fluidly connected one or more feeder pipes (also known as lateral lines) connected to the trees. In some cases, maple (or other tree) sap harvesting installations may have a vacuum pump connected to the piping system and as such the piping network may be entirely vacuumed sealed to increase sap production and thus yields of the harvesting installations. The piping systems may also collect sap using gravity only.

Figure 24:
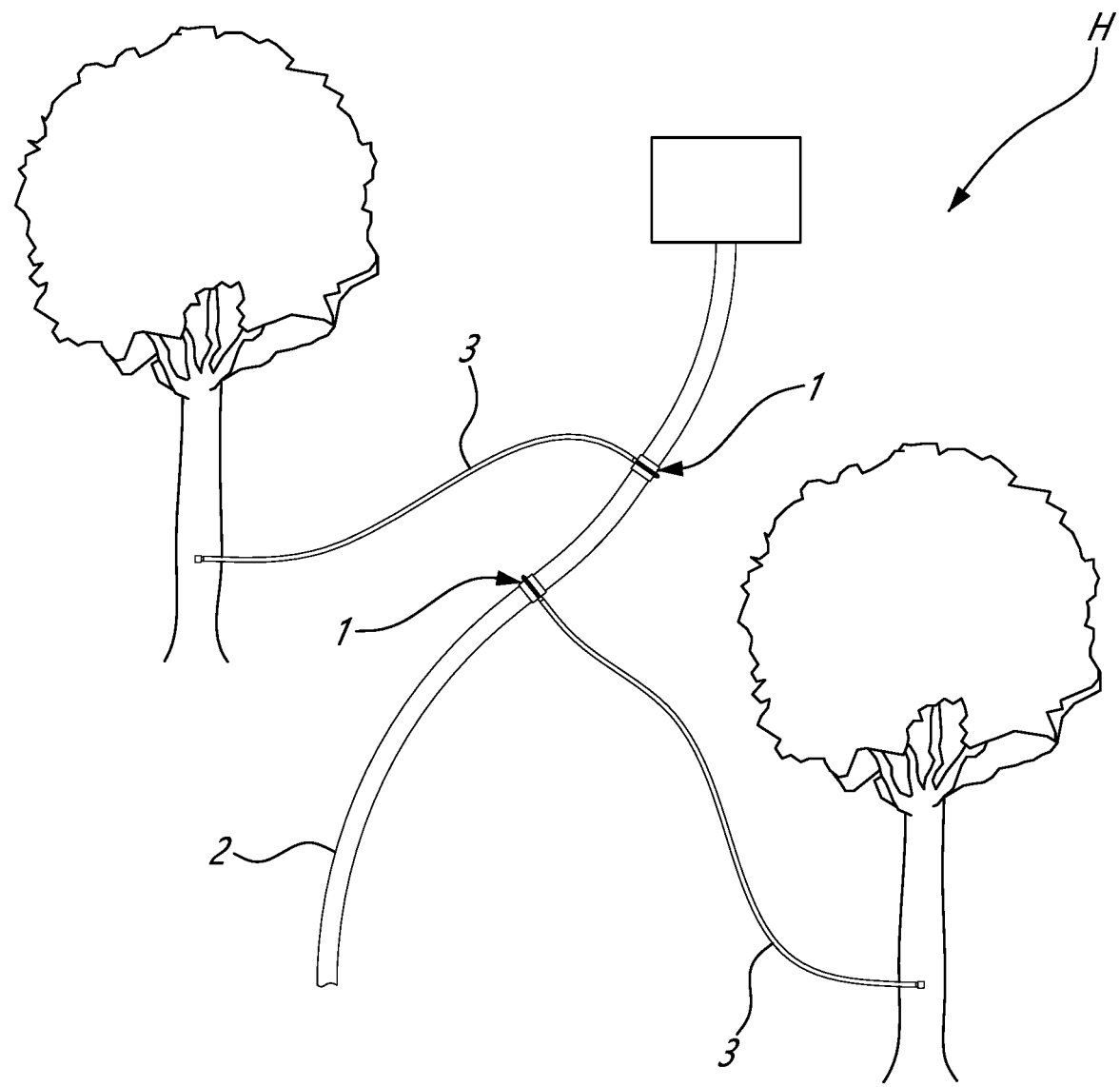
FIG. 24 is a schematic representation of a piping network with a collector pipe and feeder pipes using connectors such as shown in FIGS. 1-23.

There are many ways to connect the feeder pipes to the collector pipes in such installations. Several types of devices may be used in a piping network with feeder pipes and collector pipes. The present disclosure generally relates to connecting assemblies used for fluidly connecting feeder pipes to collectors pipes of a piping network H. An example of such a piping network H is illustrated in FIG. 24. The depicted piping network H includes at least one collector pipe 2 and feeder pipes 3 connected via a connector 1 according to the present disclosure.

FIGS. 1 to 4 illustrates a connector 1, which may also be referred to as a connecting assembly for some reasons described later, for fluidly connecting piping in a piping network H, according to a particular embodiment of the present disclosure. The connector 1 may be used to fluidly connect the collector pipe 2, also known as a main line, with one or more of the feeder pipes 3, also known as a lateral line.

The collector pipe 2 may be shaped and made in many different ways. Typically, such collector pipe 2 has a cylindrical cross-section of about 1 inch in diameter, and for maple sap harvesting, the collector pipe 2 may generally be made of a polymeric material such as low or high density polyethylene (LDPE, HDPE). The collector pipe 2 may be made of any other suitable materials, such as materials for piping used in the food sector, residential or industrial plumbing installations, or other industry sectors, and includes any materials suitable for specialized applications (e.g. chemistry/biology healthcare environments, etc.). The feeder pipe 3 may also be shaped and made in many different ways. The feeder pipe 3 for maple sap harvesting is typically smaller in size or diameter (e.g. bore size) than the collector pipe 2. Such feeder pipe 3 may also be bigger than the collector pipe 2 in other applications. The feeder pipe 3 may have a cylindrical cross-section between 3/16 inch to 5/16 inch, but other dimensions are also possible. The feeder pipe 3 may be made of a polymeric material, such as metallocene LDPE, LDPE, or other plastic materials, but other types of materials may also be used.

The connector 1 is configured to connect to the at least one of the feeder pipe 3 and the collector pipe 2. The connector 1 includes a retaining member 10 for mounting the connector 1 to the collector pipe 2. The retaining member 10 includes a base 11 having an inner surface 11A an outer surface 11B, and an opening (i.e. orifice) 12 defined through the base 11. While the opening 12 is pre-formed in the base 11 in the depicted embodiment, such opening 12 in the base 11 may be drilled or otherwise formed in the base 11 once the connector 1 is mounted on the collector pipe 2 in other embodiments.

In the depicted embodiment, the base 11 has a curved shape complementary to a curved shape of the outer surface 2A of the collector pipe 2. It may be advantageous to have a base 11 that may adapt to different sizes and/or shapes of the collector pipe 2. As such, in some cases, the base 11 of the retaining member 10 may be flexible, such that a radius of curvature of the curved base 11 when not mounted on the collector pipe 2 may be smaller than that of the collector pipe 2 on which it is intended to be mounted, such that once the base 11 mates with the curved outer surface 2A of the collector pipe 2, the base 11 slightly deforms to interface with the outer surface 2A of the collector pipe 2. This may help better conforming the base 11 to the outer surface 2A of the collector pipe 2, thereby improving the sealing (e.g. airtight or watertight sealing) capabilities of the connector 1 when mounted on the collector pipe 2.

The connector 1 includes a connecting member 13 extending from the retaining member 10. As shown, the connecting member 13 extends from the outer surface 11B of the base 11 to a distal end 18 of the connecting member 13. The connecting member 13 is configured to connect to at least one feeder pipe 3. The connecting member 13 has an opening (i.e. orifice) 14 defined at the distal end 18 thereof. The connector 1 includes a fluid channel 15 extending through the base 11 and the connecting member 13 between the opening 12 of the base 11 and the opening 14 of the connecting member 13 to convey fluid therebetween; provided the opening 12 is pre-formed or once the opening 12 is created, as discussed above. In a practical implementation of the connector 1, the opening 14 of the connecting member 13 may be an inlet by which maple sap may flow from the feeder pipe 3 through the fluid channel 15, and the opening 12 of the base 11 may be an outlet by which maple sap may exit the connector 1 and may go into the collector pipe 2 fluidly connected therewith.

In the depicted embodiment, an entirety of the connecting member 13 is elongated and projects directly from the base 11. As shown, the connecting member 13 is substantially perpendicular relative to the base 11 and straight from the base 11 to the distal end 18 of the connecting member 13. As such, the fluid channel 15 going through the base 11 and the connecting member 13 may be straight from the opening 12 of the base 11 to the opening 14 of the connecting member 13. In some embodiments, the connecting member 13 may include a plurality of members, each engaging respectively with a plurality of feeder pipes 3. In such embodiments, a single connector 1 may fluidly connect more than one feeder pipe 3 to one collector pipe 2.

Figure 13:
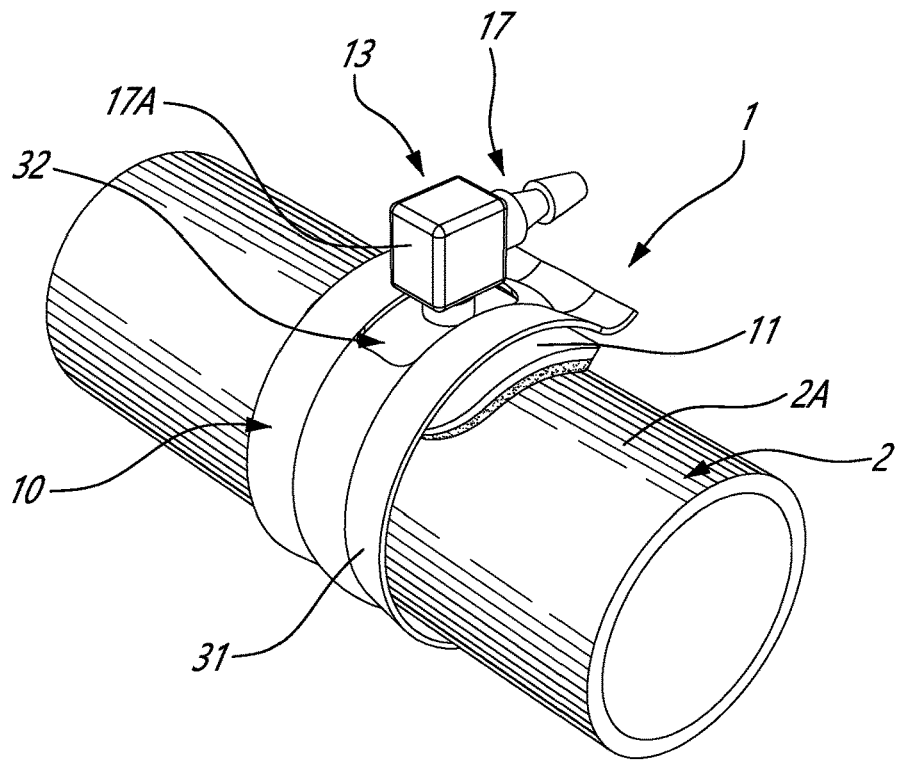
FIG. 13 is a perspective view of a connector on a collector pipe and connectable to a feeder pipe of a piping network, according to another embodiment.
Figure 14:
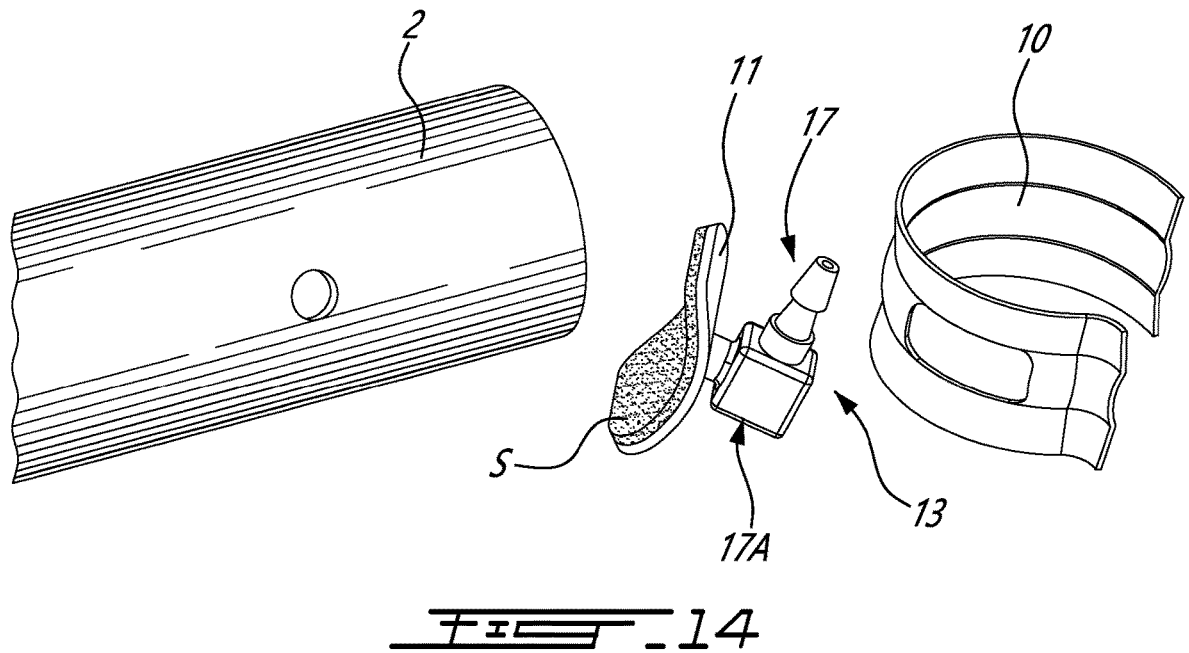
FIG. 14 is an exploded view of the connector of FIG. 13.
Figure 15:
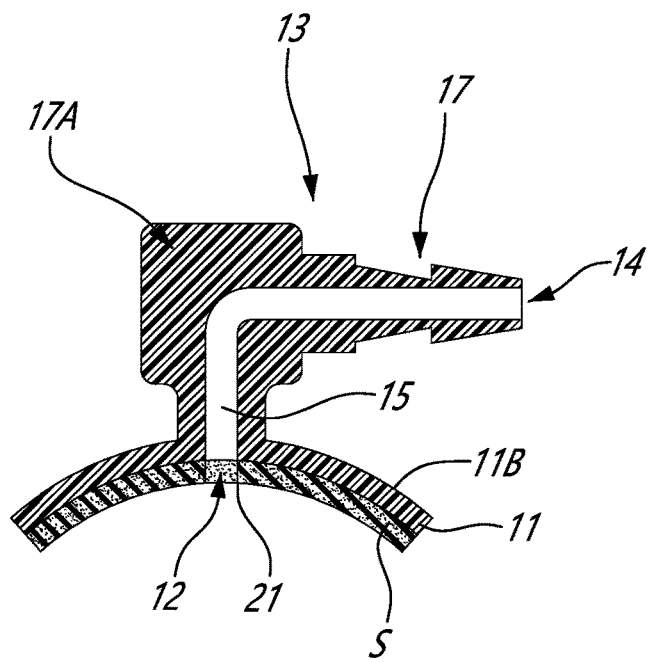
FIG. 15 is a cross-sectional view of a base with a connecting member of the connector of FIG. 13.
Figure 16:
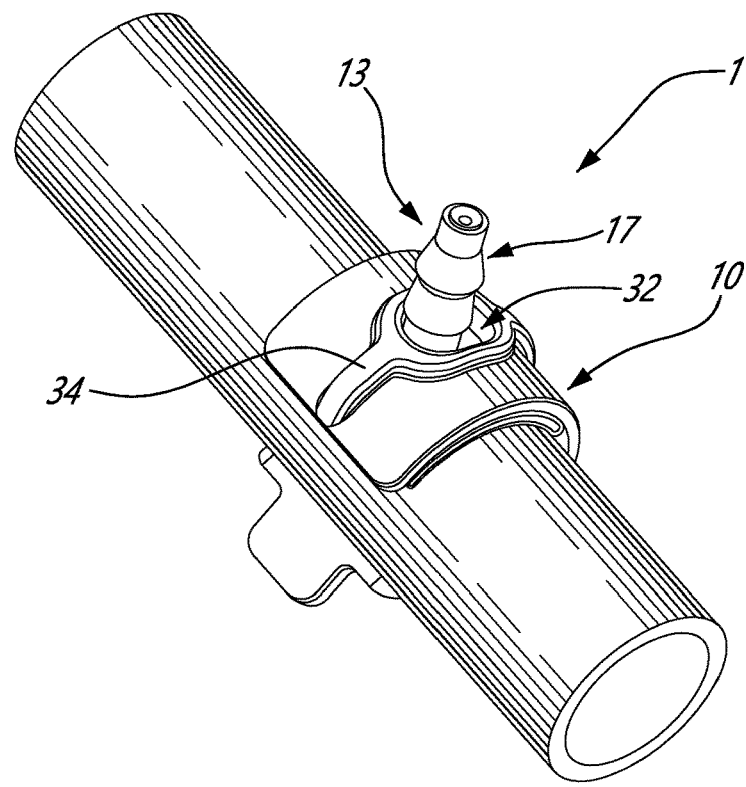
FIG. 16 is a perspective view of a connector on a collector pipe and connectable to a feeder pipe of a piping network, according to yet another embodiment.
Figure 17:
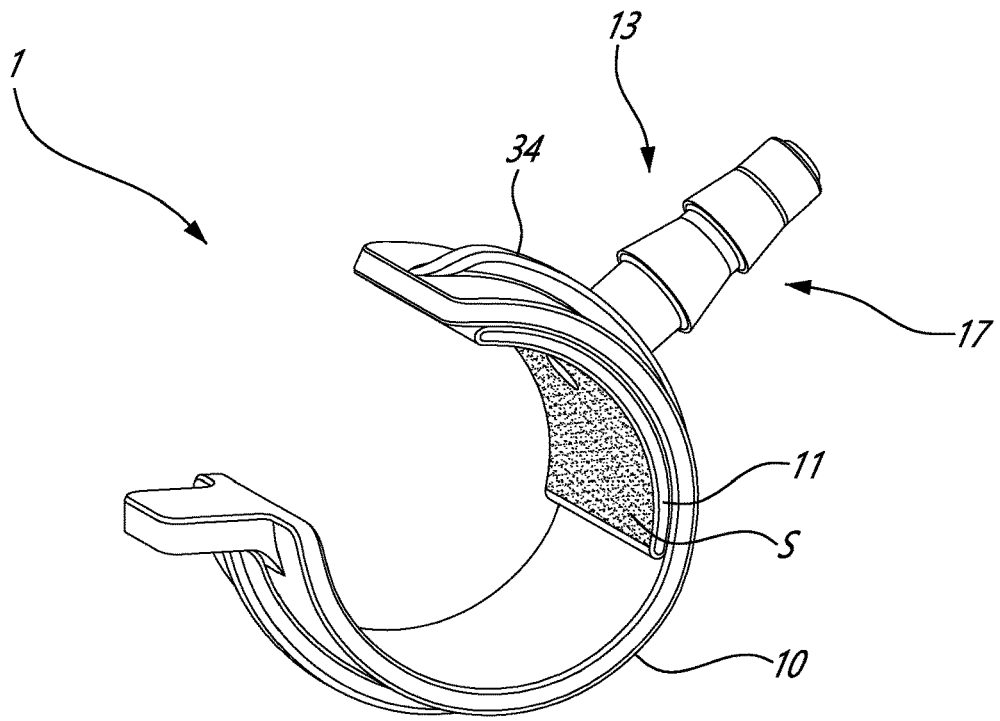
FIG. 17 is a perspective view of the connector shown in FIG. 16.
Figure 18:
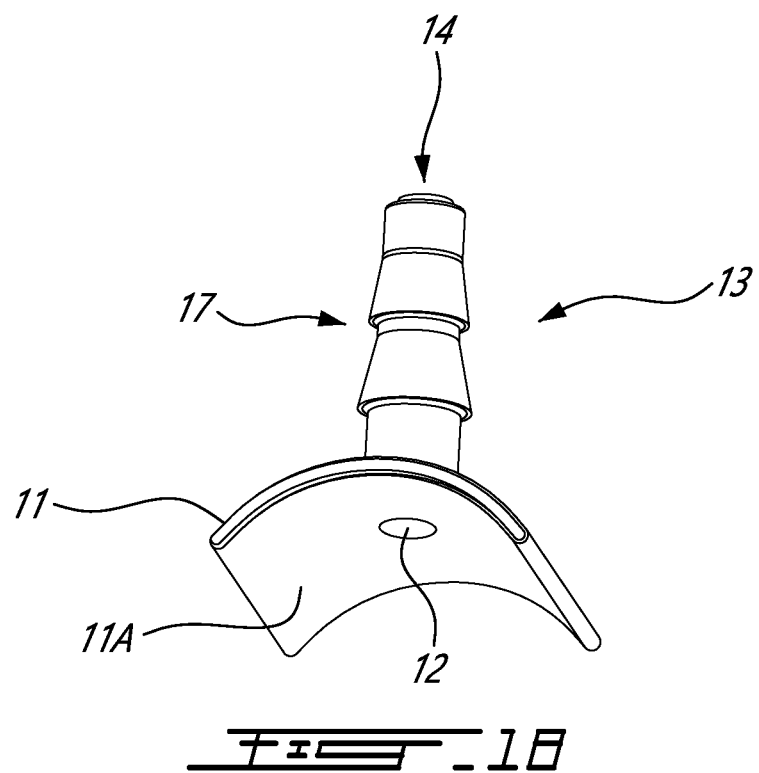
FIG. 18 is a perspective view of a connector of the connector shown in FIG. 16.
Figure 19:
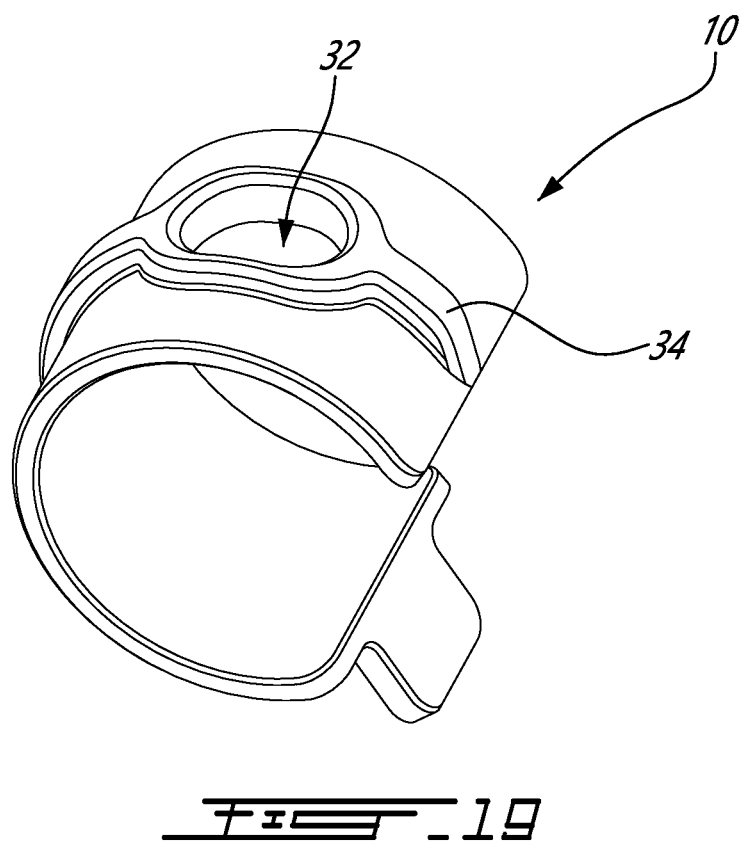
FIG. 19 is a perspective view of a retaining member of the connector shown in FIG. 16.
Figure 20:
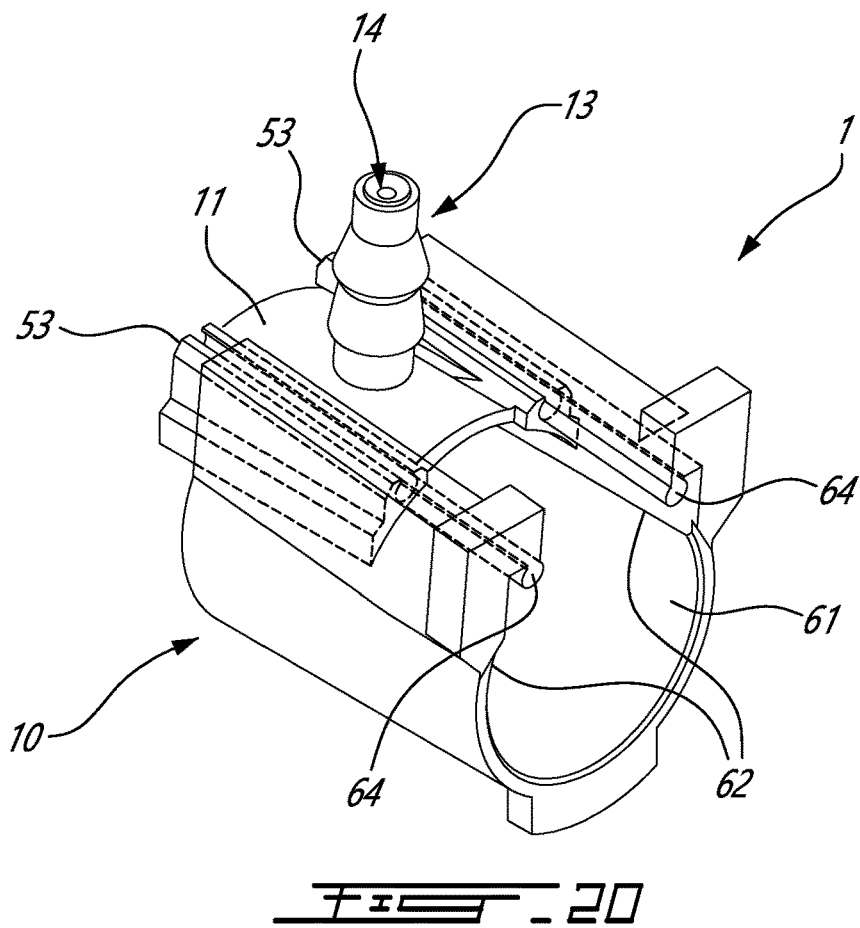
FIG. 20 is a perspective view of a connector for a piping network, according to another embodiment.
Figure 21:
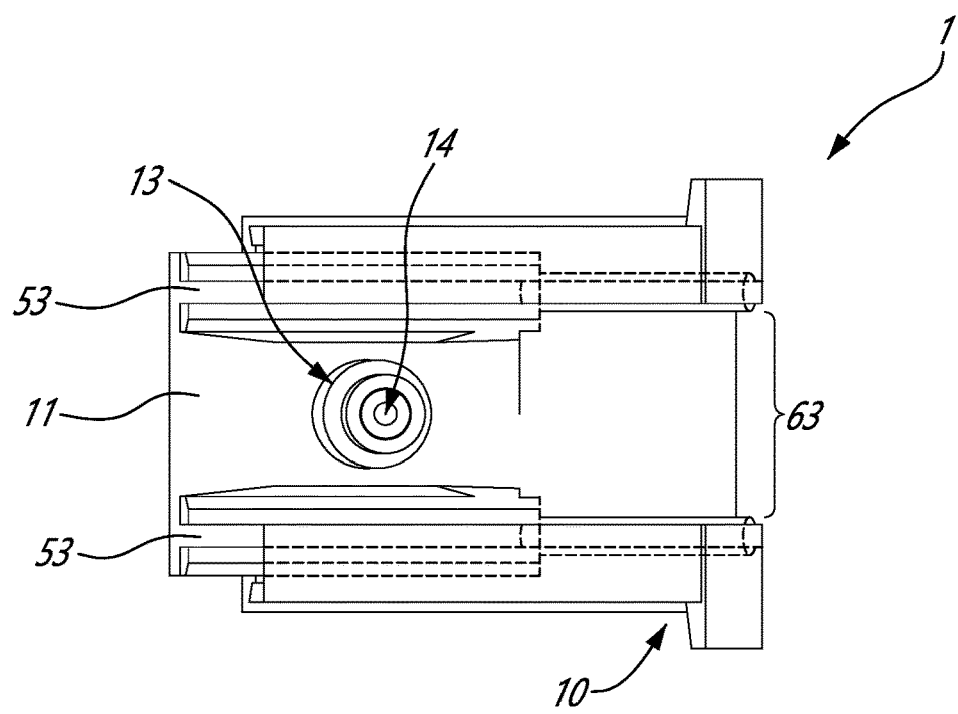
FIG. 21 is a top view of the connector of FIG. 20.
Figure 22:
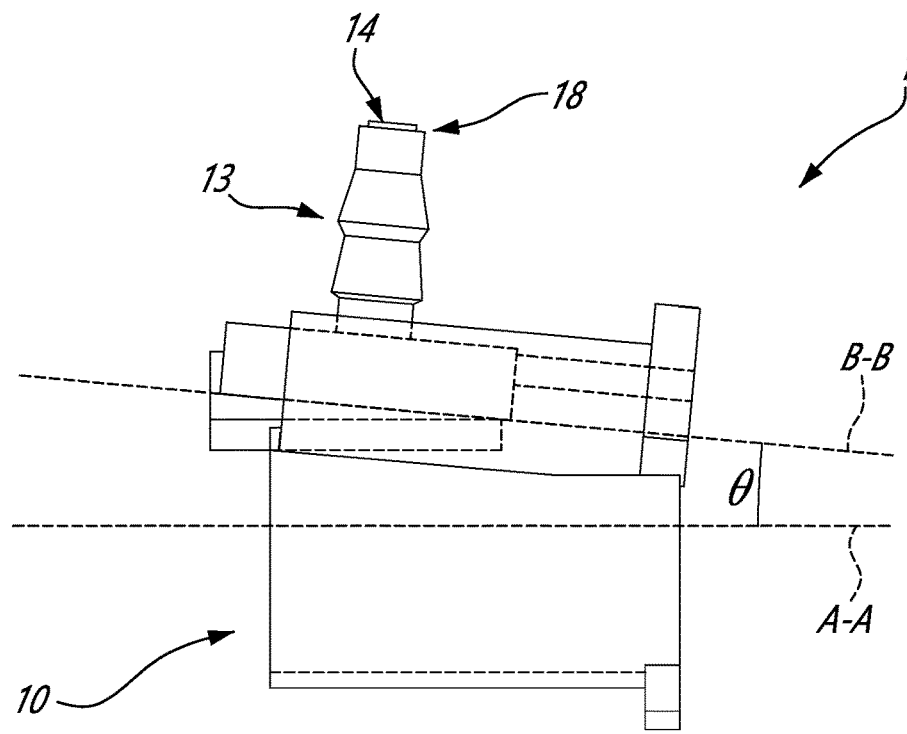
FIG. 22 is a side elevation view of the connector of FIG. 20.
Figure 23:
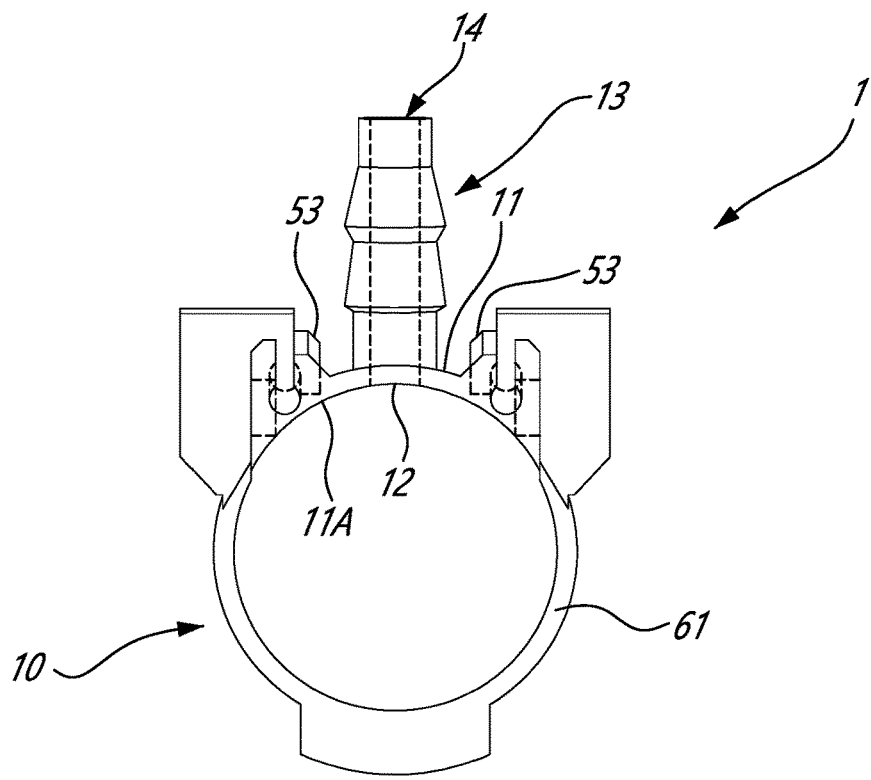
FIG. 23 is a front elevation view of the connector of FIG. 20.

In some embodiments, such as the depicted embodiments, the connecting member 13 includes a barbed segment 16 configured to receive the at least one feeder pipe 3, but this may be absent in other embodiments. The connecting member 13 may have other suitable shapes in addition to or instead of the above. The connecting member 13 may be referred to as a nozzle, which includes an elongated portion 17, with or without a barbed segment, configured to receive the at least one feeder pipe 3. The connecting member 13 may include an elbow portion (e.g. bent portion, L-shape portion, etc) between the elongated portion 17 and the base 11. One embodiment having such elbow portion is illustrated in FIGS. 13 to 15 and further described below.

In the depicted embodiment, the connector 1, including the base 11 and the connecting member 13 is made (i.e. at least in part or entirely) of a polymeric material (e.g. thermoplastic material), even though it may be made, partially or entirely, of metal or other alloys (e.g. aluminium, brass, steel, etc.) in other embodiments.

In the depicted embodiment, the retaining member 10 and the connecting member 13 are formed as a unitary piece. For instance, in some cases, the base 11 and the connecting member 13 may be integrally molded together, such as to form a unitary piece, which may be stronger as a unit and/or prevent potential leaks at a junction in between them (when compared to embodiments where the base 11 and the connecting member 13 are separate parts), which may occur after extended use. However, the base 11 and the connecting member 13 may be molded or manufactured separately and assembled together afterwards, hence forming distinct part of a connecting assembly in other embodiments. Some embodiments of connecting assemblies are discussed later.

In the depicted embodiment, the connector 1 includes a seal S (see seal S shown in isolation in FIG. 5) for mating with an outer surface 2A of the collector pipe 2 to sealingly mount the connector 1 onto the collector pipe 2. In an embodiment, the seal S of the connector 1 is affixed under the base 11 on the inner surface thereof and configured to mate with the outer surface 2A of the collector pipe 2 and sealingly mount the connector 10 thereto. The seal S may be part of the connector 1 or come as a separate part, hence the interchangeable references to a connecting assembly or a connector 1 in the present disclosure.

In some cases, the seal S defines an opening 21 generally in line with the opening 12 of the base 11. Just as the opening 12 of the base 11, the opening 21 may be formed in the seal S after installation of the connector 1 on the collector pipe 2, such as by drilling through the base 11 and the seal S, as will be described later. In some cases, the opening 21 of the seal S may be larger than the opening of the base 11. The opening 21 of the seal S may also be about the same size as the opening 12 of the base 11, or smaller than the opening 12 of the base 11, depending on the embodiments. In the depicted embodiment, the seal S covers part of the inner surface 11A of the base 11. As shown, in this case, such part covered by the seal S surrounds the periphery of the opening 12. As such, the seal S may have an annular shape and may extend along a portion of inner surface 11A of the base 11 to partially cover the inner surface 11A of the base 11. In other embodiments, the seal S may cover an entirety of the inner surface 11A (i.e. an entirety or substantially all of the surface) of the base 11.

An airtight junction between the connector 1 and the collector pipe 2 may be desirable in some embodiments, for instance where the connector 1, collector pipe 2 and feeder pipe 3 are parts of a vacuumed piping network. To this end, the seal S may contribute to such airtight junction/sealing. In an embodiment, the seal S may be permanently bonded to the base 11 and configured to be permanently bonded to the collector pipe 2 once the connector 1 is mounted thereto. A permanent bonding corresponds to a bonding where the seal S may not be unmounted without affecting the structural integrity of the seal S itself (e.g. breaking or tearing off the seal S).

The seal S may be made of many suitable materials and may have many different shapes in different embodiments. For instance, in an embodiment, the seal S is a piece of adhesive material, such as a double-sided adhesive gasket. A protective film (not shown) may be disposed on a side of the seal S not in contact with the base 11 to protect the seal S from impurities before mounting onto the collector pipe 2. The seal S may be deformable (e.g. compressible) in a direction parallel to its thickness. This may help the seal S to better conform to an uneven surface and/or providing greater sealing capabilities when sealingly mounted between the base 11 and the collector pipe 2. In an embodiment, the seal S may also be a single sided adhesive gasket, such that no adhesive may be present on the gasket on the surface contacting the collector pipe 2. In some cases, a liquid adhesive applied on the inner surface of the base 11 (or on the outer surface 2A of the collector pipe 2) may implement the seal S instead of it being a piece of adhesive material.

In order to facilitate positioning of the seal S on the inner surface 11A of the base 11, in the depicted embodiment, the base 11 includes at least one guide 37 on its inner surface 11A for indicating and/or delimiting a mounting zone on the inner surface 11A for mounting the seal S. The guide 37 may take different forms, including the form of at least one guiding rib disposed on the inner surface 11A (e.g. two guiding ribs shown at least in FIG. 4). The seal S may thus more easily be placed where it is intended to be, between the collector pipe 2 and the base 11, at a location underneath the connecting member 13 to sealingly mount the base 11 onto the collector 2 and better prevent fluid leakage that might occur between the connector 1 and the outer surface 2A of the collector 2, and/or contribute to or provide vacuum sealing of the piping network. Other guiding means 37 are possible, such as grooves, slots or visual means. Other configurations of the seal S may be contemplated in other embodiments. For instance, in an alternate embodiment, the seal S may be embedded into the inner surface 11A of the base 11. For instance, the base 11 may define a recessed area having a shape corresponding to that of the seal S to receive said seal S therein. Such recessed area may include hooks or other seal retaining features to hold and/or secure the seal S on the base 11. In such alternate embodiment, the seal S may or may not have adhesive for mounting the seal S on the inner surface 11A in addition to the seal retaining features on the connector 1.

The retaining member 10 serves at least partially to secure the connector 1 on the collector pipe 2. In an embodiment, the retaining member 10, by one or more of its properties (e.g. materials, shape, etc.) or one or more of its parts, may exert a clamping force or compression load L between the base 11 and the outer surface 2A of the collector pipe 2 when the connector 1 is mounted thereon. In the depicted embodiment, the retaining member 10 wraps partially about the collector pipe 2 as it presses the base 11 against the outer surface 2A of the collector pipe 2. Stated differently, the retaining member 10 includes a body 31 that provides the compression load L. Such body 31 may be a spring-like body, as it may exert the compression load L when elastically deformed and in a state (e.g. biased or deformed state) in which it is prevented from recovering its original state (i.e. unloaded or non-deformed state), like a loaded spring would do in a reversibly deformed state. In the depicted embodiment, the body 31 is curved such as to have a C-profiled shape (such as a ring segment) that allows for wrapping partially about the collector pipe 2, and thus forms a clamp. In such embodiment, the body 31 of the retaining member 10, in its unloaded state, has an opening or gap distance G1 defined between opposite ends 31A, 31B of the base 11 (opposite ends of the "C") that is smaller than a diameter D of the collector pipe 2. A radius R1 of curvature (i.e. opening and radius of curvature of the C-profiled shape) of the retaining member 10 in an unloaded state is smaller than an outer radius R2 of the collector pipe 2 (radius at the outer surface 2A of the collector pipe 2), such that the body 31 may resiliently deform when mounted or "clipped" on the collector pipe 2. The opposite ends 31A, 31B of the base 11 are displaceable away from each other to increase the gap distance G1 therebetween and to mount the retaining member 10 around the collector pipe 2. The resiliently deformable base 11 in the unloaded state allows the retaining member 10 to engage with the collector pipe 2 via the gap G by spreading the opposite ends 31A, 31B of the base 11 and the retaining member 10 to exert a compression load L on the collector pipe 2 once the connector 1 is mounted thereon. In other words, the retaining member 10 on the collector pipe 2, as a consequence of the resilience (i.e. resistance to bending) of the retaining member 10, may thus press against the outer surface 2A of the collector pipe 2 once mounted (mounted or "closed up") thereon. In some embodiments, the compression load L exerted by the retaining member 10 on the outer surface 2A of the collector pipe 2 may be sufficient on its own to retain the base 11 on the collector pipe 2 and apply sufficient pressure to sealingly connect the base 11 onto the collector pipe 2.

In the depicted embodiment, the retaining member 10 includes a rib 34 extending circumferentially about the base 11. Such rib 34 may rigidify the retaining member 10, such that more clamping load may be possibly applied on the outer surface 2A of the collector pipe 2 with the rib 34, than without such rib 34. In the depicted embodiment, the rib 34 is a single rib 34 aligned axially with the connecting member 13 on the outer surface 11B of the base 11. Although only one central rib 34 is shown in the depicted embodiment of, there may be more than one rib 34 in other embodiments. For instance, instead of or in addition to the central rib 34, there may be two (or more) ribs extending circumferentially along the base 11 in a direction extending along the circumference of the collector pipe when the connector 1 is mounted thereon. In some embodiments, the rib 34 may be entirely made of the same material as the base 11, but the rib 34 may also be made of other materials instead of or in addition to the material of the base 11. For instance, in some embodiments, the rib 34 may include a metal strip (e.g. strip, wire, band, or other types of reinforcement) overmolded with the material of the base 11, which may be a polymeric material (e.g. thermoplastic material), metal or other alloys (e.g. aluminium, brass, steel, etc.). The rib 34 may also be entirely made of a polymeric material such as plastic, metal, or other alloys. The remainder of the base 11 may also be made (i.e. at least in part or entirely) of a polymeric material (e.g. thermoplastic material) or may be made of metal or other alloys (e.g. aluminium, brass, steel, etc.).

The connector 1 may connect to a supporting wire 4 while mounted on the collector pipe 2. In tree sap harvesting installations, the collector pipes 2 that run between the trees may be supported by such a supporting wire 4 (typically a steel wire of about ⅛" in diameter). In the depicted embodiment, the retaining member 10 includes a wire notch 36 configured to receive such supporting wire 4. As shown in FIGS. 1 to 4, the wire notch 36 may be defined or formed in the inner surface 11A of the retaining member 10 and be disposed at one end of the base 11, in this case the end of the ring segment proximate to the connecting member 13. As shown, the wire notch 36 is opened inwardly, such that the wire notch 36 opening faces the inner surface 11A of the base 11. During installation of the connector 1, the supporting wire 4 may be inserted (e.g. clamped or otherwise received) in the wire notch 36 and the retaining member 13 may be clamped over the collector pipe 2, such that the connector 1 may be mounted on the collector pipe 2 and connect the collector pipe 2 to the supporting wire 4. The connector 1 may thus support the collector pipe 2 while it is clamped thereon. This may facilitate installing the piping network, connecting collector pipes 2, feeder pipes 3 and connectors 1 together, and/or solidifying the piping network installation.

As connector 1 may remain mounted on a collector pipe 2 and may tend to loosen over extended periods of time, safety means 82 for retaining the connector 1 tightly mounted on the collector pipe 2 may be used. In the depicted embodiment, the safety means 82 is a mechanical fastener, in this case a screw. The screw may prevent the connector 1 from unmounting (unclamping or loosening) from the collector 2 when it is suitably screwed or engaged in the connector 1. In the depicted embodiment, the retaining member 10 includes a platform 38 projecting at one end (end of the ring segment or "C" shape) thereof. In the depicted embodiment, the platform 38 has a recessed area 39 for receiving the head of the screw. The recessed area 39 defines a flat surface 39A on which an under surface of the screw head may abut upon screwing.

As shown, the platform 38 has a hole 40 for receiving said screw. In the depicted embodiment the hole 40 is unthreaded, but it may be threaded in other embodiments. The hole 40 may also be absent in some embodiments, and thus one would have to screw the fastener, with a drilling tool or other suitable tool, in the material of the platform 38 to create the hole 40. However, having a pre-formed hole 40 may provide easier alignment of the screw with respect to the platforms 38, 41 and facilitate manipulation/installation.

In the depicted embodiment, the platform 38 is a first platform, and the retaining member 10 includes a second platform 40 projecting from the other end of the C-shaped retaining member 10. The second platform 41 is configured to receive the tip of the safety means 82, such that when screwed, the safety means 82 may tap into the second platform 41, thereby tightening the retaining member 10 against the outer surface 2A of the collector 2, which may consequently increase the compression load L of the connector 1 on the collector 2. Such platform 41 may or may not be threaded prior to receiving the fastener therein, depending on the embodiment. As shown, the platform 41 has a protrusion 42 extending therefrom at an underside thereof. Stated differently, the protrusion 42 extends on a side of the retaining member 10 that faces away from the first platform 38. The protrusion 42 forms a zone of increased thickness of the platform 41 allowing more threads of the screw to engage the platform 41 over a distance greater than a distance corresponding to the thickness of the platform 41 or the base 11, which may allow a greater amount of threads engaging into the material of the platform 41 to provide a stronger mechanical link between the screw and the platform 41. In the depicted embodiment, the platforms 38, 41 face towards each other when the connector 1 is mounted on the collector pipe 2, such that a fastener, in this case a screw, can extend from one platform 38, 41 to the other. Since the base 11 is resiliently deformable, in the unloaded state of the connector 1, a distance G2 between the platforms 38, 41 is smaller than a diameter D of the collector pipe 2, and the resiliently deformable base 11 allows the platforms 38, 41 to move away from each other to vary the distance G2 between them to mount the connector 1 and to exert the compression load L on the collector pipe 2 in the biased state. While the clamping force is applied on the collector pipe 2 via the retaining member 10, additional clamping force may be applied by tightening the safety means 82, if desired. In other words, in some embodiments, the safety means 82 may only provide a negligible amount of additional clamping force when interconnecting the platforms 38, 41.

It may be desirable to avoid overtightening the connector 1 on the collector 2, which may happen when a user tightens the screw during installation, as "sufficient" tightness of the screw may be difficult to determine by the user during installation absent any guidance, which may result in a lack of repetitiveness and/or sealing uniformity between respective connector 1 mounted on the collector 2. Overtightening the screw may also tend to break or undesirably deform the platforms 38, 41 and/or the retaining member 10 during installation. In some embodiments, the connector 1 may include a screw stopper configured to limit the penetration depth of the screw into the protrusion 42 of the platform 41 and/or control the clamping force resulting from tightening the screw during installation. More particularly, in some embodiments, the protrusion 42 may include a metallic or other rigid piece (not shown) embedded therein at a predetermined depth and aligned with a screwing path of the screw to receive the screw tip. As such, when the screw tip contacts the rigid piece during screwing, further penetration may be impeded. This may cause the user to experience an increased resistance to further penetration of the screw, which may indicate that the screw is sufficiently tightened for its intended purpose. Other manners for stopping or controlling the screwing depth may be contemplated in other embodiments.

In an alternate embodiment, the means 82 may be a screw and a barrel nut receiving that screw, instead of having the screw tapped into the platform 41 of the retaining member 13. Other means 82 may also be contemplated, such as other examples described later.

Figure 1:
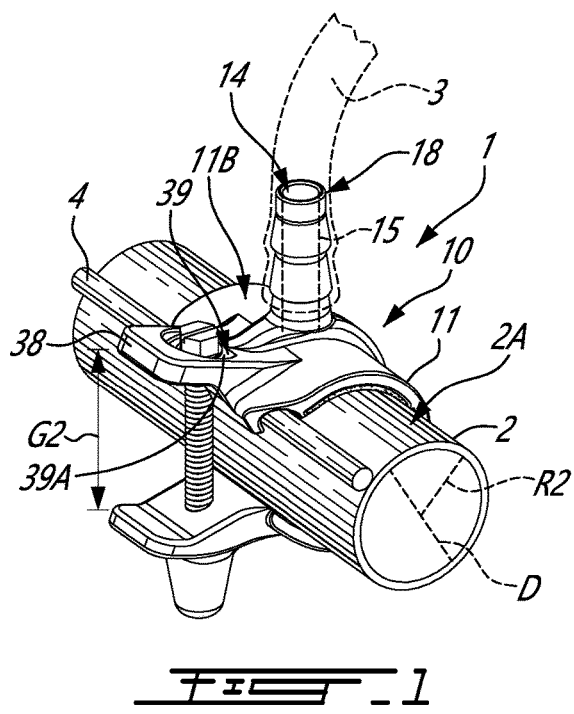
FIG. 1 is a perspective view of a connector on a collector pipe and connectable to a feeder pipe of a piping network, according to an embodiment.
Figure 2:
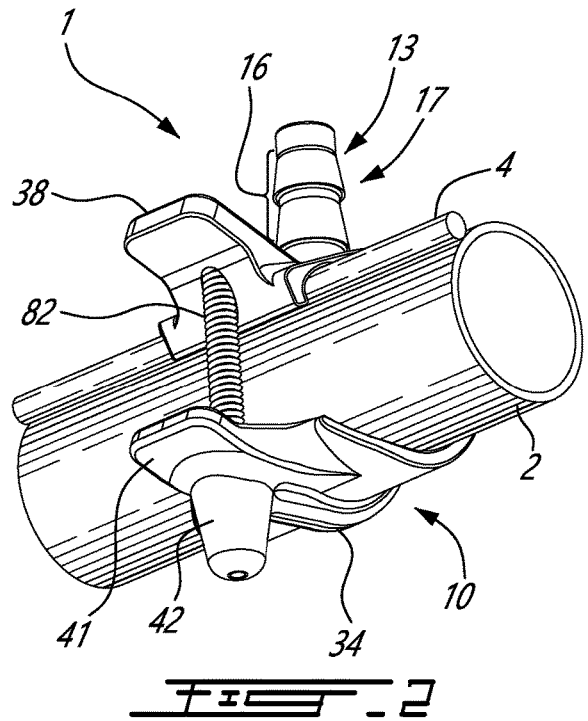
FIG. 2 is another perspective view of the connector shown in FIG. 1.
Figure 3:
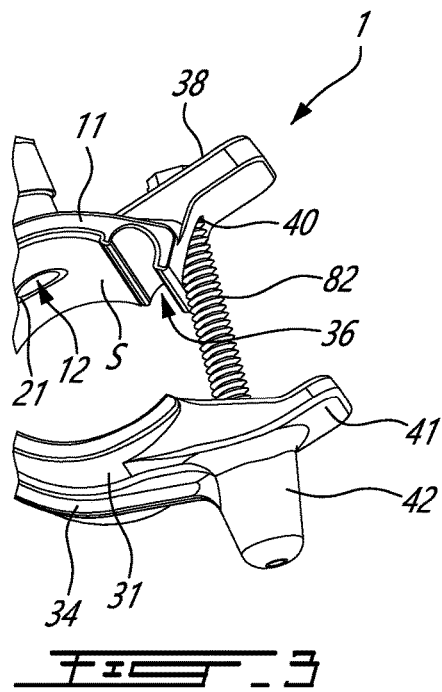
FIGS. 3 and 4 are partial perspective views of the connector shown in FIGS. 1 and 2, shown without the collector pipe.
Figure 4:
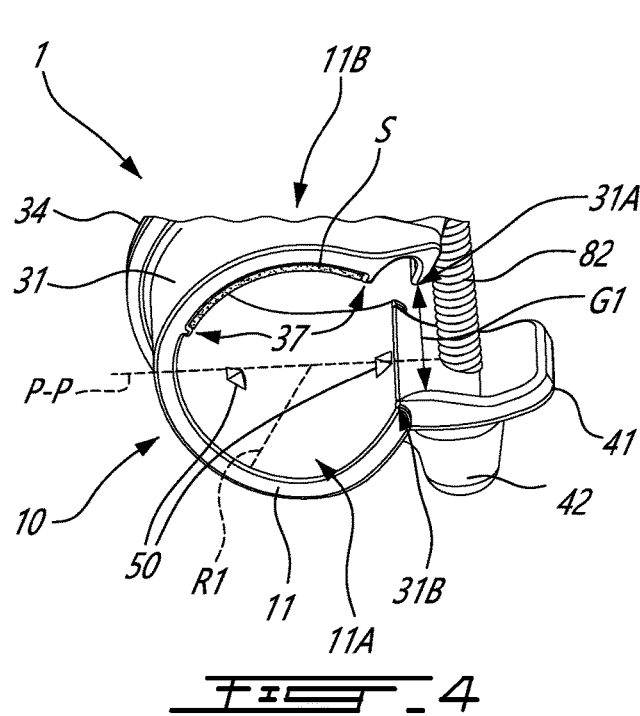

As shown in FIG. 4, the inner surface 11A of the base 11 of the retaining member 10 has at least one anchor 50 (two anchors 50 in this embodiment), which are diamond-shaped (other shapes may be contemplated, such as conical or other shapes). These anchors 50 protrude from the inner surface 11A. Upon tightening the connector 1 on the collector 2, the anchors 50 may slightly penetrate in the collector pipe 2 wall to limit or prevent relative movement (e.g. rotational, longitudinal, or both) of the connector 1 on the collector 2 once clamped thereon. In the depicted embodiment, the anchors 50 are axially aligned in a common axial plane of the connector 1 with the connecting member 13, more particularly in this case at an axial plane P-P of the connector 1. This position corresponds to the axial position of the screw on the connector 1 in the depicted embodiment. There may be more anchors 50 in other embodiments, and the anchors 50 may be disposed at other locations on the inner surface 11A in other embodiments.

Figure 6:
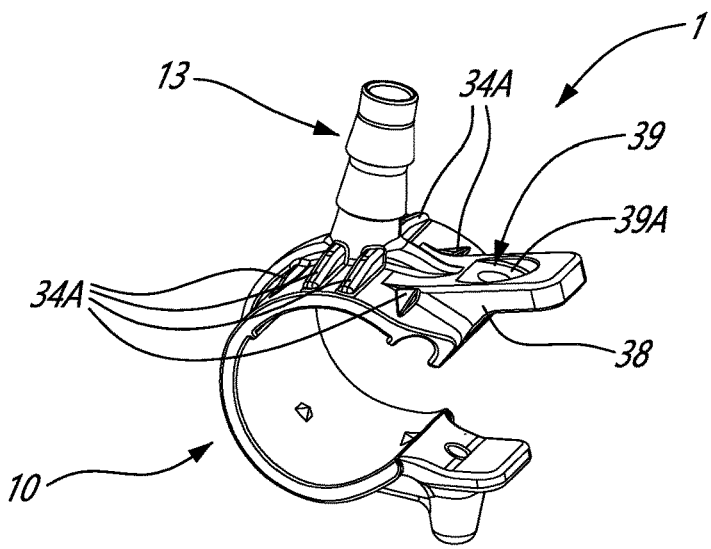
FIG. 6 is a perspective view of a variant of the connector of FIGS. 1 to 4.

Referring to FIG. 6, a variant of the connector 1 of FIGS. 1 to 4 is shown. In the depicted embodiment, the retaining member 10 has a series of transversal ribs 34A extending across the retaining member 10. The transversal ribs 34A extend transversally to the rib 34. The transversal ribs 34A are disposed on opposite sides of the connecting member 13. This may solidify the junction between the connecting member 13 and the base 11, and/or rigidify the retaining member 10 about the connecting member 13, hence less deformation (more "stability") of the inner surface 11A of the base 11 and greater sealing at the interface between the retaining member 10 and the collector pipe (not shown) may be obtained. In the depicted embodiment, at least one of the transversal rib 34A extends on opposite sides of the platform 38. In alternate embodiments, there may be more or less transversal ribs 34A, such as, for instance, only one transversal rib 34A. Although less desirable, the transversal ribs 34A may be absent. In alternate embodiments, although not shown, the transversal ribs 34A may extend in different directions and still provide added rigidity.

Figure 5:
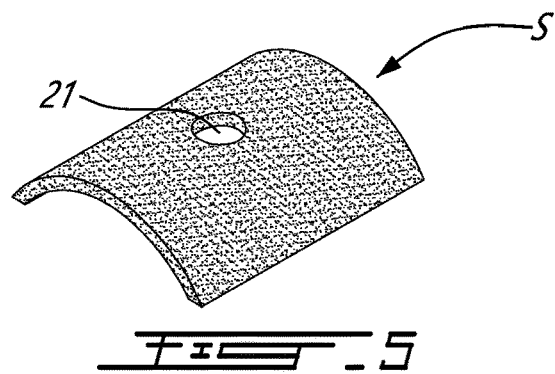
FIG. 5 is a perspective view of a seal of the connector of FIGS. 1 to 4.

While not shown in FIG. 6, this variant of the connector 1 also includes a seal (such as seal S" shown in FIG. 5). The presence of transversal ribs 34A at a location along the retaining member 13 coinciding with (or "over") the location of the seal (not shown) may therefore be desirable to enhance sealing and/or provide a more even compression load L on the collector pipe 2 at the sealing area, about the drilled (or to be drilled) hole into the collector pipe 2 and the opening 12 of the connecting member 13.

Figure 7:
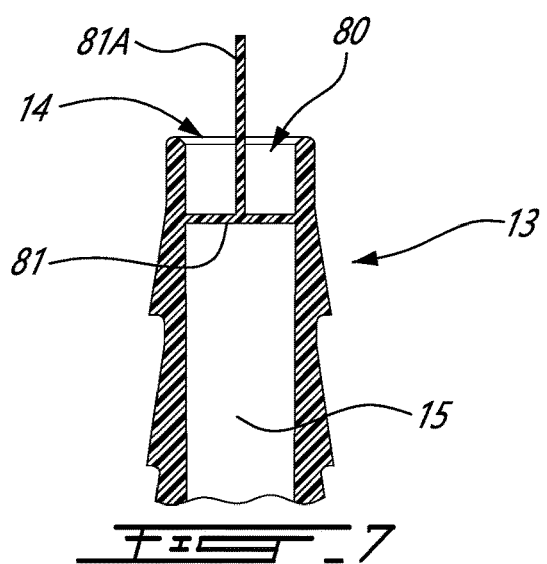
FIG. 7 is a cross-sectional view of an exemplary connecting member as used in the connectors shown in FIGS. 1 to 4 and 6, including an example of a visual indicator.

In some embodiments, the connector 1 may include a visual indicator 80 to indicate an obstruction (i.e. restriction or absence) of fluid communication within the fluid channel between the connector 1 and the collector pipe 2. The restriction of fluid communication may occur when one does not drill the outer surface 2A of the collector pipe 2 prior to mounting the connector 1 thereon. This may occur inadvertently during the installation of a piping network (e.g. one may forget to drill a hole into the collector pipe 2 before mounting the connector 1, or purposively when it is intended to drill the collector pipe 2 after a connector 1 has been mounted thereon. The connector 1 may thus be adapted to indicate whether a hole has been drilled underneath the base 11 and to allow drilling of the outer surface 2A of the collector pipe 2 after having mounted the connector 1 thereon, if required. One example of such visual indicator 80 is shown in FIG. 7. As shown, in some embodiments, the visual indicator 80 includes a membrane 81 at least partially fluidly obstructing (partially or entirely) the fluid channel 15 of the connector 1. The membrane 81 may be integrally molded with the connector 1. The membrane 81 and the connector 1 may be made of a same material, or of different materials. In some cases, although not illustrated, the membrane 81 may be located adjacent to the opening 12 (adjacent or at) of the base 11 (sometimes referred to as the outlet, as discussed above). In some cases, although not illustrated, the membrane 81 may be located adjacent to the opening 14 (i.e. adjacent or at) of the connecting member 13 (sometimes referred to as the inlet, as discussed above). Yet in some cases, the membrane 81 may be disposed between the opening 14 of the connecting member 13 and the opening 12 of the base 11 (FIG. 7). In the depicted embodiment, the visual indicator 80 includes a pin 81A that sticks out of the fluid channel 15, such that an observer may witness the presence of the visual indicator 80 from a surrounding environment. Such visual indicator 80 may be implemented in embodiments where the connecting member 13 and the fluid channel 15 are substantially straight from the base 11 to the distal end 18 of the connecting member 13. During installation of one or more connectors 1 on collector pipe(s) 2, one may install the connector 1 on the outer surface 2A of the collector pipe 2 and clamp the connector 10 onto the collector pipe 2 with the retaining member 13 prior to drilling a hole in the collector pipe 2. Then, as the visual indicator 80 may be witnessed by an observer (e.g. a piping installer), said observer may be informed that there is no hole underneath the connector 1. As such, a drilling bit or other suitable tools may be used to drill/pierce through the visual indicator 80 and in turn through the collector pipe 2 all at once. This may ensure better alignment between the hole in the collector pipe 2 and the fluid channel 15 of the connector 10.

Figure 8:
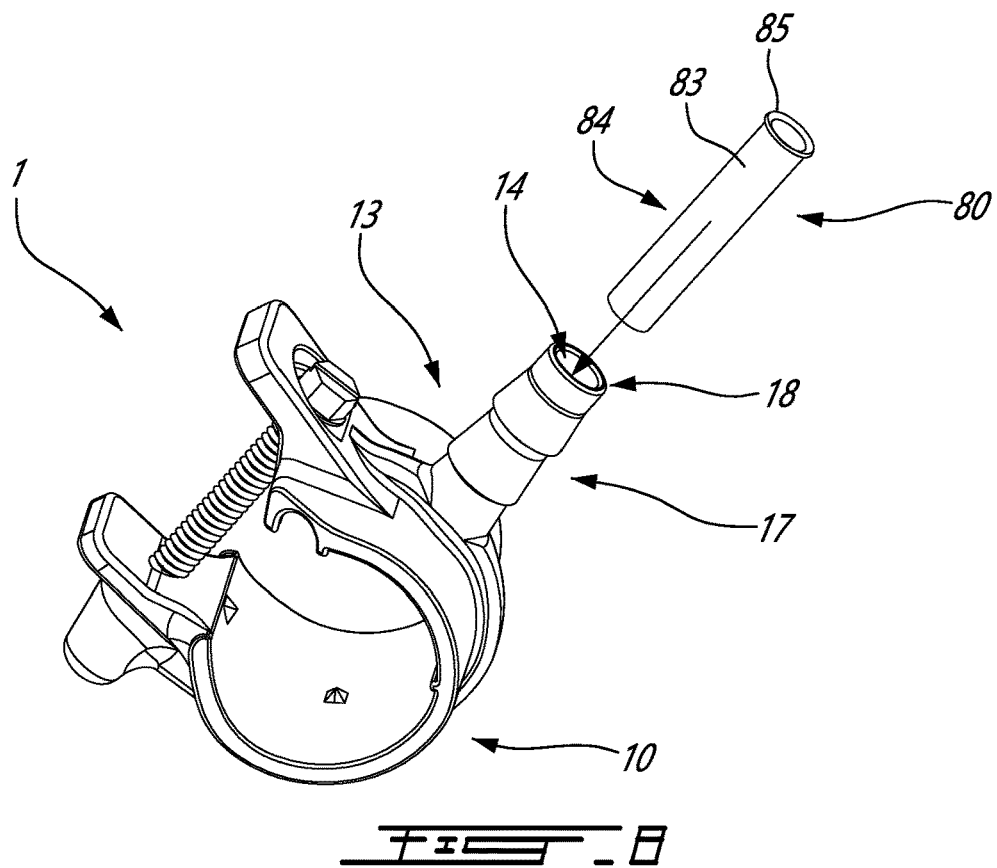
FIG. 8 is a another perspective view of an exemplary connector, including an another example of a visual indicator.
Figure 9:
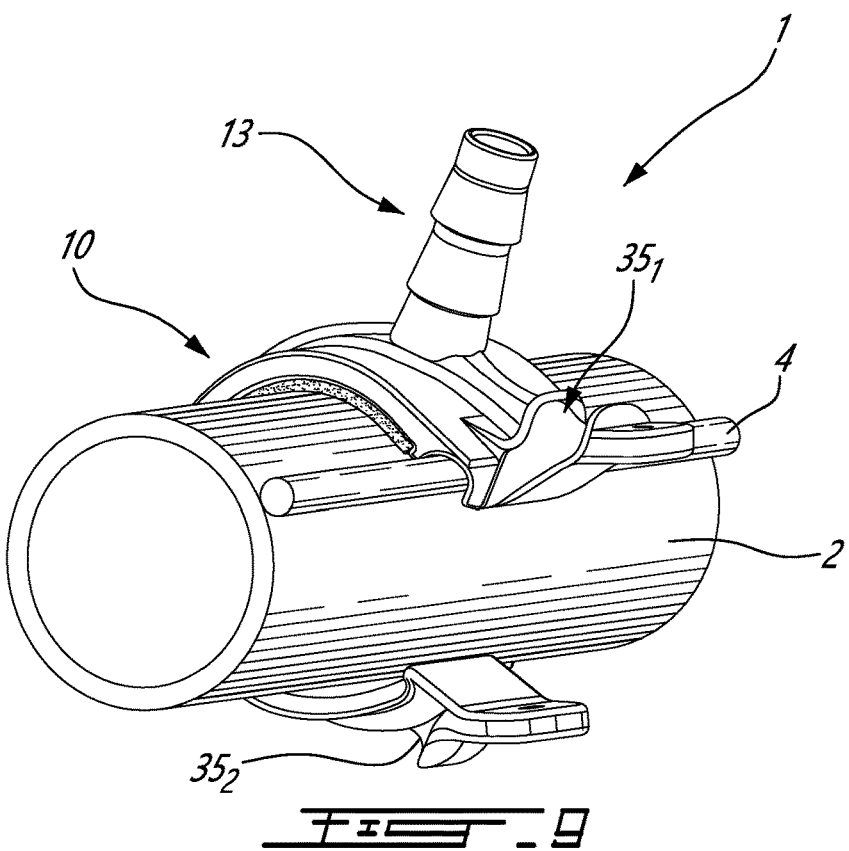
FIG. 9 is a perspective view of a connector on a collector pipe and connectable to a feeder pipe of a piping network, according to another embodiment.
Figure 10:
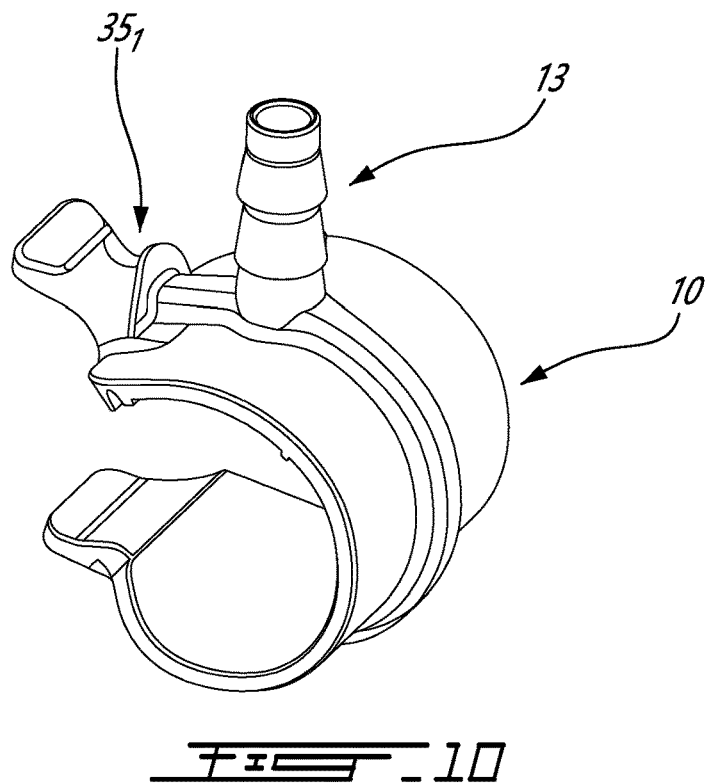
FIG. 10 is another perspective view of the connector shown in FIG. 9, shown without collector pipe.
Figure 11:
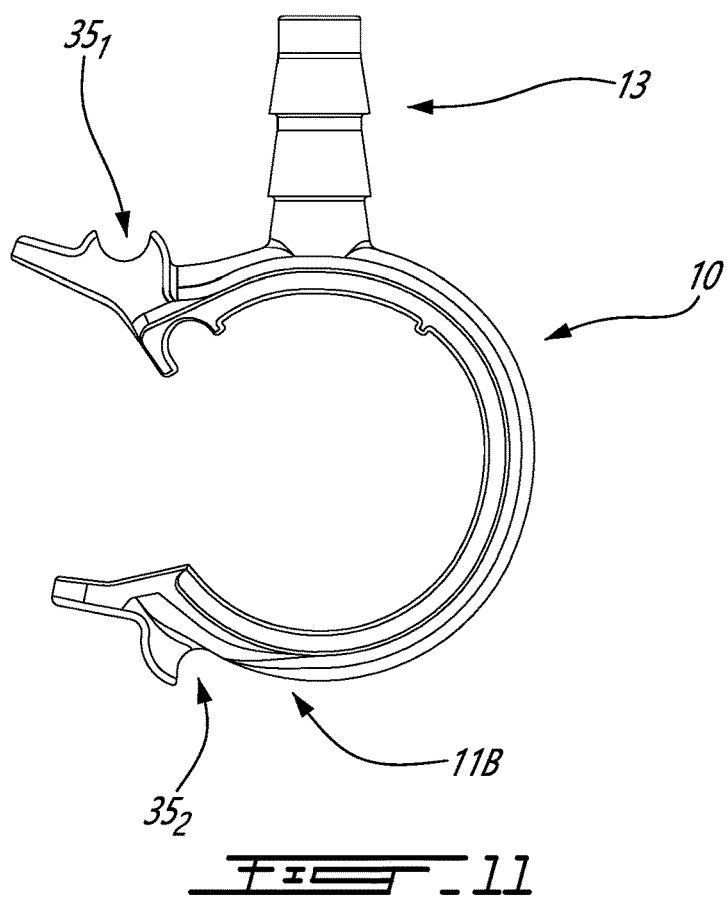
FIG. 11 is a side view of the connector shown in FIG. 9.
Figure 12:
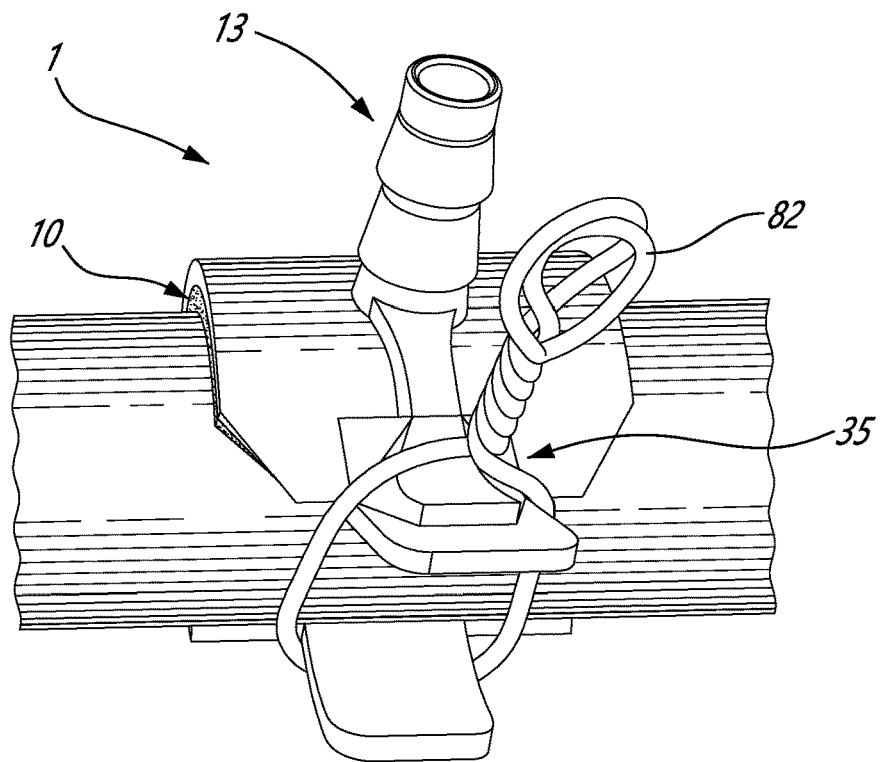
FIG. 12 is another perspective view of the connector shown in FIG. 9.

Referring to FIG. 8, an exemplary connector 1 is shown, with another example of the visual indicator 80. As depicted in FIG. 8, the visual indicator 80 is the form of a sleeve 83 which may be inserted into the connecting member 13. The sleeve 83 has an elongated body 84, in this case a cylindrical body having a diameter corresponding to the bore of the elongated portion 17 of the connecting member 13 such as to allow to be inserted inside the elongated portion 17. The cross-section of the sleeve 83 may be non-circular in other embodiments, such as, for instance, polygonal. The sleeve 83 has a flange 85 at one end thereof. The flange 85 has an outer diameter that is greater than the bore of the elongated portion 17, such that the flange 85 may abut against the distal end 18 of the connecting member 13 to block further axial movement of the sleeve 83.

The sleeve 83 is longer than the elongated portion 17 of the connecting member 13. As such, when the connector 1 is mounted on a collector pipe 2 and the collector pipe 2 has not been drilled (either purposively not drilled before installing the connector 1, or inadvertently not drilled, as discussed above), the sleeve 83 may stick out from the distal end 18 of the connecting member 13. The flange 85 is thus not abutted against the distal end 18. Such a position of the sleeve 83 may indicate that a hole has not been drilled in the collector pipe 2 or that the hole is not correctly aligned with the connecting member 13, since the sleeve 83 end opposite the flange 85 is abutted against the outer surface 2A of the collector pipe 2.

In instances where a hole has been drilled in the collector pipe 2 prior to installing the collector 1 thereon, and where the opening 14 of the connecting member 13 is coaxially aligned with the hole, the sleeve 83 may be inserted into the elongated portion 17 of the connecting member 13 and through the hole until the flange 85 abuts against the distal end 18 of the connecting member 13. In this case, the sleeve 83 visually indicates that a hole has actually been drilled and that the hole is aligned with the opening 14 of the connecting member 13, allowing fluid communication therebetween once the sleeve 83 is removed. The presence of the sleeve 83 in the elongated portion 17 and in said hole may also allow for keeping the hole in the collector pipe 2 and the connector 1 in alignment while the connector 1 is being secured in place on the collector pipe 2 to ensure fluid communication will be maintained after installation. In other words, the sleeve 83 may thus prevent axial and circumferential movement between the collector 1 and the collector pipe 2 until the collector 1 is fully secured in place (during tightening or otherwise installing the safety means 82 of the connector 1), or help locate the position of the hole in the collector pipe 2 wall when the connector 1 is being mounted on the collector pipe 2 and align the opening 12 with the hole. This may facilitate proper installation of the collector 1 on the collector pipe 2.

The sleeve 83 may be made of any suitable material, however using stainless steel, such as food-grade stainless steel, or other material which does not oxidize over time may be desirable.

Other configurations of the visual indicator 80 are possible. In an embodiment, the visual indicator 80 is in the form of a cap mounted at the distal end 18 of the connecting member 13. Similar as discussed above with respect to other embodiments, the cap may indicate that there is no hole underneath the connector 1, by its presence at the distal end 18. In some cases, the cap may be coloured with a distinctive colour (e.g. vivid/bright colour) for an even more noticeable indication and eye-catching effect.

FIGS. 9 to 12 show another example of connector 1. The connector 1 shares similarities (structural and/or functional) with other embodiments discussed above. Only the features that are different (structurally and/or functionally) than the ones discussed above with respect to other embodiments will be discussed in more detail below. It is to be understood that any characteristics and/or properties of the features of embodiments discussed above may equally apply to the similar features discussed below with respect to the following embodiment.

With reference to FIGS. 9 to 12, the connector 1 comprises a retaining member 10 and a connecting member 13, similar to other embodiments discussed above. The retaining member 10 and the connecting member 13 are integrally molded together, such that they form a unitary piece. As discussed above with respect to other embodiments, safety means 82 for retaining the connector 1 tightly mounted on the collector pipe 2 may be used. In the depicted embodiment, the safety means 82 is a wire (other attachment means may be used, such as a zip-tie or a twist-tie) tied to the connector 1 to prevent it from unmounting (unclamping or loosening) from the collector 2. In order to facilitate the installation and retention of such safety retaining means, the retaining member 10 includes at least one hook portion 35 projecting from the outer surface 11B of the retaining member 10. As shown in FIGS. 9 to 12, the retaining member 10 has a pair of hook portions $35_1$, $35_2$ adjacent opposite ends thereof. A user may thus tie opposite ends of the retaining member 10 together by attaching the attachment means around the hook portions $35_1$, $35_2$, thereby tightening the retaining member 10 around the outer surface 2A of the collector 2, which may consequently increase the compression load L of the connector 1 against the collector 2. These hook portions $35_1$, $35_2$ may hold the attachment means in place and/or prevent such attachment means from slipping away from the retaining member 10 once tighten thereon.

Referring to FIGS. 13 to 15, another exemplary connector or connecting assembly 1 is shown. In the embodiment, the retaining member 10 and the base 11 are separate parts, such that the retaining member 10 and the base 11 may be removably disconnected from one another, hence the reference to a "connecting assembly". As such, depending on the pipe size of the collector pipe 2 on which the connecting assembly is intended to be mounted, a retaining member 10 adapted to a specific size of collector pipe 2 may be provided, such that the compression load L exerted on the collector pipe 2 by the retaining member 10 may be independent from the size of the collector pipe 2 upon which the connecting assembly 1 is being installed. In the depicted embodiment, the retaining member 10 overlies at least in part the base 11 and wraps partially about the collector pipe 2 while pressing the base 11 against the outer surface 2A of the collector pipe 2. In some cases, such as shown, the retaining member 10 defines an opening 32 for receiving the connecting member 13 when the retaining member 10 overlies at least in part the base 11 of the connector 10. Similarly as discussed above with respect to other embodiments, the retaining member 10 of this embodiment includes a body 31 that provides the compression load L. The body 31 may thus clamp the collector pipe 2 and the base 11 tightly together. Stated differently, the retaining member 10 presses the base 11 against the outer surface 2A of the collector pipe 2. In some embodiments, the body 31 may be configured to press the base 11 against the outer surface 2A of the collector pipe 2 with a predetermined compression load L between the base 11 and the outer surface 2A of the collector pipe 2.

In the depicted embodiment, the body 31 is made of metal. The body 31 is made entirely of metal, but it may include a cover layer made of another material, such as an elastomeric material (e.g. rubber) or another polymeric material (e.g. urethane-based material such as thermoplastic polyurethane (TPU), fluoropolymer-based material such as polytetrafluoroethylene (PTFE), other plastic materials, etc.) in other embodiments. In some embodiments, the body 31 may be implemented by a spring steel clip that may press the base 11 against the outer surface 2A of the collector pipe 2, as discussed above. In other cases, the body 31 may not include metal and may be made entirely of plastic. Having a body 31 made of metal may be advantageous over plastic, in some cases, as it may not deteriorate (e.g. lose its spring-like or resilience effect, thereby losing its compressive effect over time on the base 11 and the outer surface 2A of the collector pipe 2 when the connector 1 is mounted thereon) under harsh outside conditions (cold temperature during winter, heat from the sun that may affect properties of plastic materials, chemical reaction with surrounding environments, etc.) when mounted in a sap harvesting piping network over an extended period of time (i.e. sometimes such connector 1 may remain in place for 15 to 20 years).

In the depicted embodiment, the connecting member 13 includes an elongated portion 17 and an elbow portion 17A (e.g. bent portion, L-shape portion, etc) between the elongated portion 17 and the base 11. In the depicted embodiment, the fluid channel 15 going through the base 11 and the connecting member 13 has a first segment extending from the opening 12 of the base 11, and a second segment extending from the first segment to the opening 14 of the connecting member 13, the first segment of the fluid channel having an orientation transverse to an orientation of the second segment (e.g. at 90 degrees from one another, or at another angle), such that the inlet and the outlet of the connector 1 are not be oriented along a same direction.

FIGS. 16 to 19 shows another example of the connector 1. The connector 1 shares similarities (structural and/or functional) with other embodiments discussed above, notably the embodiment of FIGS. 13 to 15. Only the features that are different (structurally and/or functionally) than the ones discussed above with respect to other embodiments will be discussed in more detail below. It is to be understood that any characteristics and/or properties of the features of embodiments discussed above may equally apply to the similar features discussed below with respect to the following embodiment.

In the depicted embodiment, similar to the embodiment discussed above with reference to FIGS. 13 to 15, the retaining member 10 and the base 11 are separate parts, such that the retaining member 10 and the base 11 may be removably disconnected from one another, hence the reference to a "connecting assembly". In the depicted embodiment, the rib 34 (as discussed above) is present on the base 11. A portion of the rib 34 surrounds the opening 32 in the retaining member 10. The increased thickness of material defined by the rib 34 surrounding the opening 32 may limit deformation of the opening 32 and deformation of the retaining member 10, for instance to prevent or limit cracking, tearing or otherwise weakening of the retaining member 10 in this area.

FIGS. 20 to 23 illustrate a variant of connecting assembly 1 for fluidly connecting piping in a piping network, according to an alternate embodiment. Only the features that are different (structurally and/or functionally) than the ones discussed above with respect to other embodiments will be discussed in more detail below. It is to be understood that any characteristics and/or properties of the features of embodiments discussed above may equally apply to the similar features discussed below with respect to the following embodiment. With reference to FIGS. 20 to 23, the retaining member 10 and the base 11 are made as separate parts as for other embodiments discussed above. A seal S (not shown, but such as the one of FIG. 5) is disposed on the inner surface 11A of the base for mating with an outer surface 2A of the collector pipe 2 and sealingly mounting the base 11 onto the collector pipe 2. The retaining member 10 may secure the base 11 to the collector pipe 2. In this embodiment, the base 11 and the retaining member 10 are configured to slidingly interlock with one another. Additionally, an axial movement, along a longitudinal axis A-A, between the base 11 and the retaining member 10 may progressively induce a compression load L between the base 11 and the outer surface 2A of the collector pipe 2 when the connector 1 is mounted thereon.

In the depicted embodiment, the connector 1 includes a base 11 that has a curved shape. The base 11 is complementary with the curved outer surface 2A of the collector pipe 2. An opening 12 is defined through the base 11. The base 11 includes a pair of rails 53 extending longitudinally therealong, such that the rails 53 extend along a length of the base 11. The rails 53 are transversally spaced apart from one another. In this case, the rails 53 are female rails (e.g. grooves) configured to receive complementary male rails. In other cases, the rails 53 may also be male rails configured to be received in complementary female rails. The connector 1 includes a connecting member 13 that projects from the base 11. The connecting member 13 is located between the pair of rails 53. The connecting member 13 has an opening 14 defined at a distal end 18 thereof. The connector 1 includes a fluid channel 15 that extends through the base 11 to the distal end 18 of the connecting member 13 between the openings of the base 11 and the connecting member 13 to convey fluid between the base 11 and the connecting member 13. The seal S (not shown) is affixed on the inner surface 11A of the base 11 (i.e. under the base 11) and is configured to mate with the outer surface 2A of the collector pipe 2 and sealingly mount the connector 11 onto the collector pipe 2. In this embodiment, the retaining member 10 includes a curved wall 61 that defines a portion of a cylinder delimited by a pair of distal edges 62 that extend along a longitudinal axis A-A of the retaining member 10 and that are transversally spaced apart from one another. The curved wall 61 has an inner surface configured to engage the curved outer surface 2A of the collector pipe 2. A slot 63 is defined between the pair of distal edges 62. The base 11 may engage the slot when the base 11 and the retaining member 10 are assembled together. The retaining member 10 has a pair of rails 64, in this case a pair of elongated protrusion configured to engage the complementary female rails 53 of the base 11, transversally spaced apart and that extend along both ones of the pair of distal edges 62. The rails 64 (e.g. elongated protrusion) of the retaining member 10 are configured to slidingly interlock with respective ones of the pair of female rails 53 of the base 11. As the rails 53 of the base 11 and the rails 64 of the retaining member 10 are being engaged to one another, the base 11 progressively presses against the outer surface 2A of the collector pipe 2. Such relative axial movement between the base 11 and the retaining member 10 results in a clamping of the collector pipe 2 between the base 11 and the retaining member 10. In order to progressively induce the compression load L upon axially moving the retaining member 10 relative to the base 11, a longitudinal axis B-B of the rails 53, 64 is at an angle θ relative to the longitudinal axis A-A of the retaining member 10 (see FIG. 22). As such, upon axially moving the retaining member 10 relative to the base 11 in an axial direction along the axis A-A, when the connector 1 is mounted on the collector pipe 2 and the rails 53, 64 are engaged together, the base 11 and the retaining member 10 may progressively press (i.e. clamp) against the collector pipe 2. In an embodiment, the angle θ may be about 5 degrees. In other embodiments, the angle θ may have a different value. For instance, in some cases, the angle θ may range between 2 and 20 degrees.

In accordance with the present disclosure, a kit including at least one connecting assembly may include a retaining member 10 suitable for a specific size of collector pipe 2 and a separate base 11 from which a connecting member 13 extends. Alternately, such a kit may include at least one base 11 with a connecting member 13 extending therefrom, and a plurality of retaining members 10 adapted for respective piping sizes and each mountable to the base 11 provided with the kit. Such kits may also be provided with at least one feeder pipe 3 and/or at least one collector pipe 2 intended to be fluidly connected together using the at least one connecting assembly 1 of the kits. It is to be understood that such kits may include a connector/connecting assembly according to any of the embodiments discussed in the present disclosure. In cases where the retaining member 10 and the remainder of the connector 1 form a unitary piece, as discussed above, the kit may include a plurality of connector 1 identical to each other and suitable for connecting to a specific size of collector pipe 2, or various connectors 1 suitable to different sizes of collector pipe 2.

The above description is meant to be exemplary only, and one skilled in the art will recognize that changes may be made to the embodiments described without departing from the scope of the invention disclosed.

Although not specifically described, the connecting assemblies of the present disclosure may be used elsewhere than in sap harvesting installations. For instance, the connectors or connecting assemblies may be used in other types of piping networks and/or in other sectors, sometimes with suitable adaptations, such as in the healthcare sector, commercial and industrial sector, applied sciences sector (e.g. in laboratories), food sector, aeronautical sector, or any other sectors/environments where fluid pumping and/or routing in piping networks may apply.

Modifications which fall within the scope of the present invention will be apparent to those skilled in the art, in light of a review of this disclosure, and such modifications are intended to fall within the appended claims.

The invention claimed is:

1. A connector for fluidly connecting a collector pipe and a feeder pipe, the connector comprising:
   a retaining member defining a base having an inner surface and an outer surface, the base being curved to wrap at least partially about the collector pipe, the base defining a pair of platforms extending at opposite ends of the base and facing towards each other upon the connector being mounted on the collector pipe, the base being resiliently deformable such that in a non-deformed state, a radius of curvature of the base is smaller than an outer radius of the collector pipe and a distance between the platforms is smaller than a diameter of the collector pipe, the platforms being displaceable away from each other to vary the distance between them to mount the connector and to exert a clamping force on the collector pipe; and
   a connecting member extending from the outer surface of the base to a distal end of the connecting member for engaging the feeder pipe, the connecting member having a connecting member opening defined at the distal end and defining a fluid channel extending from the connecting member opening to receive fluid from the feeder pipe.

2. The connector as defined in claim 1, wherein one of the platforms includes a protrusion extending on a side of said platform that faces away from the other one of the platforms, the protrusion forming a zone of increased thickness of said platform.

3. The connector as defined in claim 2, the protrusion being engageable by a fastener extending from the other one of the platforms to the protrusion, wherein a screw stopper is embedded into the protrusion and configured to limit a screwing depth of the fastener into the protrusion.

4. The connector as defined in claim 1, wherein one of the platforms has a hole defined therethrough configured to receive a fastener.

5. The connector as defined in claim 1, wherein one of the platforms defines a recessed area for receiving a head of a fastener.

6. The connector as defined in claim 5, wherein the recessed area defines a flat surface to abut an under surface of the fastener head.

7. The connector as defined in claim 1, wherein the retaining member includes a rib extending circumferentially about the base at the outer surface of the base.

8. The connector as defined in claim 7, wherein the rib is a single central rib aligned axially with the connecting member on the outer surface of the base.

9. The connector as defined in claim 7, wherein the rib and the base are made of a polymeric material.

10. The connector as defined in claim 1, wherein the retaining member includes a wire notch configured to receive a supporting wire, the wire notch defined in the inner surface of the base and disposed at one of the ends of the base proximate to the connecting member.

11. The connector as defined in claim 10, wherein the wire notch is opened inwardly such that the wire notch faces the inner surface of the base.

12. The connector as defined in claim 1, comprising a seal on the inner surface of the base, the seal configured to mate with an outer surface of the collector pipe to sealingly mount the connector onto the collector pipe.

13. The connector as defined in claim 12, wherein the seal defines an opening generally in line with a base opening.

14. The connector as defined in claim 12, wherein the inner surface of the base defines at least one seal guiding rib, the seal guiding rib located along at least part of a periphery of the seal to locate a seal mounting zone on the inner surface of the base.

15. The connector as defined in claim 1, wherein the inner surface of the base defines at least one anchor protruding therefrom, the at least one anchor adapted to penetrate in an outer surface of the collector pipe once the connector is mounted thereon.

16. The connector as defined in claim 15, wherein the at least one anchor is axially aligned in a common axial plane of the connector with the connecting member.

17. The connector as defined in claim 1, wherein the retaining member has at least one transversal rib extending across the retaining member at the outer surface of the base, the transversal rib disposed adjacent the connecting member.

18. The connector as defined in claim 17, wherein the retaining member has a series of transversal ribs extending on opposite sides of the connecting member.

19. The connector as defined in claim 1, further comprising a visual indicator including a membrane at least partially fluidly obstructing the fluid channel.

20. The connector as defined in claim 19, wherein the membrane is integrally molded with the connector.

21. The connector as defined in claim 1, further comprising a visual indicator in the form of a sleeve insertable in the connecting member through the connecting member opening, the sleeve including a flange at one end thereof.

22. The connector as defined in claim 1, wherein the fluid channel extends straight from the base to the distal end of the connecting member.

23. The connector as defined in claim 1, wherein the connecting member and the retaining member are integral with one another such as to form a unitary piece.

24. A connector for fluidly connecting a collector pipe and a feeder pipe, the connector comprising:
a retaining member defining a base having an inner surface and an outer surface, the base being curved to wrap at least partially about the collector pipe, the base having opposite ends defining a gap therebetween, the base being resiliently deformable such that in a non-deformed state a radius of curvature of the base is smaller than an outer radius of the collector pipe and a distance of the gap is smaller than a diameter of the collector pipe, the opposite ends of the base being displaceable away from each other to increase the distance of the gap and to mount the retaining member around the collector pipe, the base in a deformed state exerting a clamping force on the collector pipe; and
a connecting member extending from the outer surface of the base to a distal end of the connecting member for engaging the feeder pipe, the connecting member having a connecting member opening defined at the distal end and defining a fluid channel extending from the connecting member opening to receive fluid from the feeder pipe, a removable visual indicator disposed in the fluid channel to at least partially obstruct the fluid channel.

25. The connector as defined in claim 24, wherein the visual indicator includes a membrane at least partially obstructing the fluid channel.

26. The connector as defined in claim 25, wherein the visual indicator includes a pin extending from the membrane and sticking out of the distal end of the connecting member.

27. The connector as defined in claim 24, wherein the visual indicator includes a sleeve insertable in the fluid channel through the connecting member opening, the sleeve including a flange at one end thereof.

28. The connector as defined in claim 27, wherein the sleeve is longer than the fluid channel of the connecting member.

29. The connector as defined in claim 28, wherein a distal end of the sleeve is insertable through a hole in the collector pipe aligned with a base opening, the flange of the sleeve abutting on the distal end of the connecting member when the sleeve is inserted through the hole of the collector pipe.

30. A method for fluidly connecting a collector pipe and a feeder pipe with a connector, the method comprising:
clamping the connector on an outer surface of the collector pipe;
removing a visual indicator at least partially fluidly obstructing a fluid channel of the connector;
forming a hole in the collector pipe to be in fluid communication with the fluid channel; and
connecting the feeder pipe to the connector to fluidly connect the feeder pipe to the collector pipe via the fluid channel.

31. The method as defined in claim 30, the visual indicator including a membrane in the fluid channel, wherein removing the visual indicator includes drilling through the membrane.

32. The method as defined in claim 30, the visual indicator including a sleeve insertable in the fluid channel, wherein removing the visual indicator includes removing the sleeve from the fluid channel.

33. The method as defined in claim 30, the connector having a curved base to wrap at least partially around the collector pipe, the method comprising mounting a seal on an inner surface of the curved base prior to clamping the connector on the outer surface of the collector pipe.

34. The method as defined in claim 30, the connector having a curved base to wrap at least partially around the collector pipe, a pair of platforms extending at opposite ends of the curved base and facing each other when the connector is mounted on the collector pipe, the platforms defining a gap therebetween, the method comprising connecting a fastener to the pair of platforms, the fastener interconnecting the platforms to exert additional clamping force between the connector and the collector pipe.

35. A connector for fluidly connecting a collector pipe and a feeder pipe, the connector comprising:
- a retaining member defining a base having an inner surface and an outer surface, the base being curved to wrap at least partially about the collector pipe, the base having opposite ends defining a gap therebetween, the base being resiliently deformable such that in a non-deformed state a radius of curvature of the base is smaller than an outer radius of the collector pipe and a distance of the gap is smaller than a diameter of the collector pipe, the opposite ends of the base being displaceable away from each other to increase the distance of the gap and to mount the retaining member around the collector pipe, the base in a deformed state exerting a clamping force on the collector pipe;
- a connecting member joined to the base and having a distal end for engaging the feeder pipe, the connecting member having a connecting member opening defined at the distal end, the connecting member defining a fluid channel extending therethrough from the connecting member opening.

* * * * *